United States Patent [19]

Porter

[11] Patent Number: 5,165,972
[45] Date of Patent: Nov. 24, 1992

[54] COATED GLASS

[75] Inventor: David A. Porter, Birkdale, England

[73] Assignee: Pilkington PLC, St. Helens, United Kingdom

[21] Appl. No.: 860,248

[22] Filed: Mar. 27, 1992

Related U.S. Application Data

[63] Continuation of Ser. No. 529,748, May 25, 1990, abandoned, which is a continuation of Ser. No. 762,844, Aug. 6, 1985, abandoned.

[30] Foreign Application Priority Data

Aug. 13, 1984 [GB] United Kingdom ................ 8420534

[51] Int. Cl.$^5$ .................... B32B 17/06; B32B 31/00
[52] U.S. Cl. ........................ 428/1; 428/428; 428/446; 428/448; 428/447; 428/429; 65/60.53; 65/60.8
[58] Field of Search ............ 428/1, 428, 446, 448, 428/429, 447; 65/60.53, 60.8; 359/74

[56] References Cited

U.S. PATENT DOCUMENTS

| | | | |
|---|---|---|---|
| 4,019,887 | 4/1977 | Kirkbride et al. | 427/252 X |
| 4,100,330 | 7/1978 | Donley | 428/429 |
| 4,144,684 | 3/1979 | Kirkbride et al. | 428/428 X |
| 4,188,444 | 2/1980 | Landau | 428/428 |
| 4,385,806 | 5/1983 | Fergason | 350/347 R |
| 4,485,146 | 11/1984 | Mizuhashi et al. | 428/428 |

FOREIGN PATENT DOCUMENTS 2031756 4/1980 United Kingdom.
1602217 11/1981 United Kingdom.

Primary Examiner—Alexander S. Thomas
Attorney, Agent, or Firm—Burns, Doane, Swecker & Mathis

[57] ABSTRACT

The invention relates to barrier coatings to prevent migration of alkali metal ions from a glass surface. The barrier coatings are deposited by pyrolysis of a silane gas on the glass surface above 600° C. in the presence of a gaseous electron donating compound, whereby oxygen from the glass is incorporated with silicon to form a transparent barrier coating up to 50 nm thick on the glass surface. The barrier coatings are used to prevent migration of alkali metal ions into overlying layers sensitive to alkali metal ions e.g. in glass coated with electroconductive or infra red reflecting coatings, and in liquid crystal displays.

24 Claims, 1 Drawing Sheet

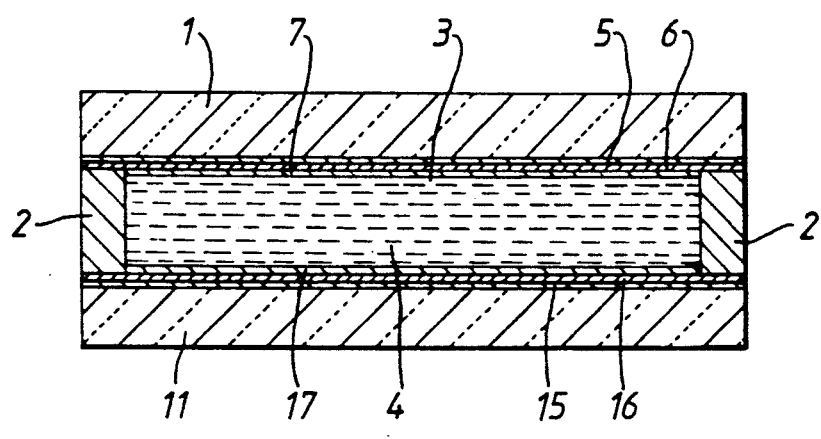

COATED GLASS

This application is a continuation of application Ser. No. 07/529,748, filed May 25, 1990 is now abandoned which is a continuation of Ser. No. 06/762,844, filed Aug. 6, 1985 is now abandoned.

FIELD OF THE INVENTION

The invention relates to the production and use of glass with a surface coating which provides a barrier to the migration of alkali metal ions out of the glass surface, and to products incorporating such coated glass.

DESCRIPTION OF THE PRIOR ART

It is known that certain surface coatings on glass deteriorate as a result of migration of alkali metal ions out of the glass surface into the coating. For example, U.K. Patent Specification 705 934 describes the appearance of haze in a transparent electro-conductive coating on soda lime silica glass. The haze may be reduced by removing alkali metal ions from the glass surface before applying the electroconductive coating, or by applying an intermediate film, for example of silica or titanium oxide, before the electroconductive coating is applied. The silica films are prepared either by applying a solution of silicon tetrachloride or tetrabromide or of silicochloroform in a volatile non-aqueous solution, to the glass, and exposing to the atmosphere until the coating is dry and then rubbing until the coating is bright, or by dipping a glass sheet in a solution of a partially hydrolysed silica acid ester, for example ethyl ortho silicate, and drying.

European Patent Specification EP 0 071 865 A3 is similarly concerned with the deterioration of electroconductive coatings on soda lime silica glass as a result of alkali metal ions diffusing to the glass surface and interacting with overlying layers sensitive to alkali metal. It refers to white turbidity in the electroconductive layer, reduction in transparency, increase in electrical resistance and reduction in physicochemical durability as possible consequences of such diffusion. It also refers to the deterioration of liquid crystal display devices, electrochromic devices and amorphous silicon photovoltaic cells as a result of the diffusion of alkali metal ions from a glass substrate. Such devices generally include electroconductive layers, for example of indium tin oxide, on the glass, but EP 0 071 865 A3 refers to effects (additional to any direct effect of the alkali metal ions on the electroconductive layer) which result from interaction of the alkali metal ions with layers overlying the electroconductive layer.

EP 0 071 865 A3 proposes to prevent the diffusion of alkali metal ions from a glass substrate by use of a barrier layer of silicon oxide which contains hydrogen bonded to silicon. The barrier layer may be prepared by vacuum vapour deposition, sputtering, ion plating, sol/-gel methods or by CVD i.e. chemical vapour deposition. In the CVD methods described, silicon oxide layers are deposited on glass substrates under oxidising conditions at temperatures of from 300° C. to 550° C. from oxygen gas and monosilane gas ($SiH_4$) in ratios of $O_2:SiH_4$ of 10:1 to 60:1.

U.K. Patent Specification 2 031 756B discloses the use of layers of metal oxide, including silicon oxide, as colour damping layers to reduce the irridescent reflection colours exhibited by infra red reflecting coatings of semiconductor metal oxides on glass. The semiconductor metal oxide may be a fluorine doped tin oxide, and the specification refers to the known effect of amorphous silicon oxide layers in inhibiting diffusion of alkali metal ions from the glass thereby avoiding haze formation on subsequent deposition of an overlying tin oxide layer. The colour damping layers used in accordance with U.K. Patent Specification 2 031 756B preferably have a refractive index of 1.7 to 1.8 and are from 64 to 80 nm thick. Layers containing silicon oxide may be prepared by chemical vapour deposition on hot glass at 300° to 500° C. using silane in the presence of an oxidising gas.

U.K. Patent Specification 1 507 465 describes a process for applying a reflective coating of silicon to flat glass to provide a solar control glass with an aesthetically pleasing silver reflection colour. The coating is applied by releasing silane gas into a hot zone opening towards the glass surface, and maintaining non-oxidising conditions in the said hot zone, so that the silane pyrolyses depositing the reflecting silicon coating on the glass surface. U.K. Patent Specification 1 573 154 describes an improvement in the process of 1,507,465 for producing reflecting solar control glass; in the improved process, a gaseous electron donating compound, for example ethylene, is added to the silane containing gas and leads to an unexpected improvement in the resistance of the coated glass to attack by external alkali. The ratio of electron donating compound to silane is generally 0.1 to 2.0, and preferably 0.2 to 0.5, although the specification does refer to the use of a ratio greater than 2.5, for example 5, to produce an alkali resistant silicon coating with very good abrasion resistance but without the high reflectivity to visible light obtained in the absence of the electron donating compound. The coatings are applied to architectural glass, and the examples describe the application of the coatings to 6 mm soda lime silica float glass and to rolled glass. Coatings obtained using ethylene as the electron-donating compound were analysed and it was found that, although they were prepared under non-oxidising conditions, they contained some oxygen.

SUMMARY OF THE INVENTION

The applicant has found that thin transparent coatings produced in the presence of a high proportion of electron donating compound as described in U.K. Patent Specification 1 573 154 contain oxygen derived from the glass and are surprisingly effective as barriers to the migration of alkali metal ions from the glass surface. The resultant coated glasses are useful as substrates for overlying layers (whether lying directly on the barrier layer or over an intermediate layer) sensitive to alkali metal ions.

According to the present invention there is provided a method of reducing diffusion of alkali metal ions from a glass containing alkali metal ions into an overlying layer which method comprises providing between the glass and the overlying layer a transparent barrier coating containing silicon and oxygen applied by pyrolysis of a silane gas characterised in that the silane is pyrolysed on a glass surface above 600° C. in the presence of a gaseous electron donating compound whereby oxygen from the glass is incorporated with silicon to form a transparent barrier coating up to 50 nm thick on the glass surface.

The expression "transparent barrier coating" is used herein to refer to coatings which, when present on clear float glass up to 6 mm thick, result in the coated glass having a light transmission of at least 75%.

The invention further provides a method of coating a glass containing alkali metal ions in which a silane gas is pyrolysed on the glass surface above 600° C. in the presence of a gaseous electron donating compound, whereby oxygen from the glass is incorporated with silicon to form on the glass surface a transparent barrier coating up to 50 nm thick containing silicon and oxygen, and a layer sensitive to the diffusion of alkali metal ions from the glass is subsequently applied over the coated glass surface.

The layer sensitive to the diffusion of alkali metal ions from the glass may be a light transmitting layer of doped metal oxide.

BRIEF DESCRIPTION OF THE DRAWING

The figure shows a liquid crystal device according to the invention.

DETAILED DESCRIPTION OF THE INVENTION

Electron donating compounds are compounds which contain, either in bonds or as lone pair electrons, electrons which can be donated into the electronic structure of suitable acceptor molecules. Examples of electron donating compounds which contain the donor electrons in bonds are unsaturated hydrocarbons, especially olefins (alkenes) and acetylenes (alkynes), for example ethylene, butadiene, pentene, difluoroethylene, and acetylene ($C_2H_2$), and aromatic hydrocarbons, for example benzene and xylene. Examples of electron donating compounds which contain their donor electrons in lone pairs are ethers, amines, aldehydes, ketones, alcohols, hydrides of nitrogen, carbon monoxide and carbon dioxide. It is preferred, for reasons of convenience, to use electron donating compounds which are gaseous under ambient conditions, but other electron donating compounds can be used without undue difficulty provided they have a vapour pressure of at least 5 KPa at 60° C.

The use of the electron donating compound is found to result, in a manner not understood, in the incorporation of oxygen from the glass with silicon from the silane to form the transparent barrier coating on the glass. Although the mechanism is not understood, it is believed to involve adsorption of the electron donating compound on the glass surface.

Thus, although the pyrolysis may be carried out in the absence of any oxygen containing gases, a transparent coating containing silicon and oxygen derived from the glass is obtained and not a reflecting silicon coating.

The rate of migration of oxygen containing species from the glass depends on the glass temperature, and the coating is therefore deposited at a glass temperature above 600° C. in order to increase the availability of oxygen-containing species from the glass.

The oxygen in the transparent barrier coatings is not necessarily all derived from the glass, but may be derived in part from the electron donating compound and some further oxidation may occur when the coated glass is exposed to atmospheric oxygen after the coating operation. However, it is preferred to use electron donating compounds which are free from oxygen or which, although they contain some oxygen, are generally regarded as reducing, for example carbon monoxide and alcohols. In general, it is preferred to avoid the use of oxygen-containing gases which react with silane before it reaches the hot glass surface with the deposition of powdery deposits of silicon oxides. In particular, the presence of molecular oxygen should be avoided.

In a preferred aspect of the invention, the electron donating compound is oxygen free. Examples of oxygen free electron donating compounds which may be used are unsaturated hydrocarbons, aromatic hydrocarbons, amines and hydrides of nitrogen.

Because the amount of oxygen containing species available from the glass is limited, the transparent coatings produced using electron donating compounds which are free from oxygen are of limited thickness, and the invention is particularly concerned with transparent barrier coatings containing silicon and oxygen and having a thickness up to 50 nm.

The proportion of electron donating compound to silane required to produce a transparent coating will depend on the particular electron donating compound used, and can readily be determined by simple trial in which the proportion of electron donating compound to silane is increased until a satisfactory light transmitting coating is produced. Suitable proportions of gaseous electron donating compound:silane will generally be in the range 0.5:1 to 15:1 by volume. When using an olefin, it has been found that proportions of olefin:silane in the range 3:1 to 10:1 give the best results.

The use of excessive proportions of certain oxygen free electron donating compounds to silane has been found to inhibit the formation of any coating and should be avoided. The particular proportion which constitutes an excess will depend on the particular electron donating compound used, but can readily be determined by simple trial.

Because the transparent barrier layers used in the present invention may be prepared in the absence of free oxygen and compounds generally regarded as oxidising agents, the barrier coating may be applied to a ribbon of float glass as it is advanced over the molten metal bath on which it is formed without undue risk of oxidising the molten metal. It is preferably applied at a glass temperature in the range 600° to 750° C., and especially at a glass temperature in the range 600° to 700° C.

The barrier coatings may be applied using the laminar flow process and apparatus described in U.K. Patent Specification 1,507,465. Preferably, the silane used is monosilane, and it is used in admixture with an inert gas, for example nitrogen.

The coatings used in the invention are highly effective as barriers to the migration of alkali metal ions, with coatings as thin as 15 nm giving excellent effects, while even thinner coatings, e.g. 5 nm or even thinner, have useful barrier properties.

For some applications, a high degree of transparency is required and coatings which, on clear float glass up to 6 mm thick, provide a light transmission of at least 80% are preferred. In addition, for some applications, it is desirable that the barrier have good resistance to external alkali. We have found that the coatings prepared in the presence of electron donating compounds which are organic contain significant quantities of carbon and have good resistance to attack by external alkali.

After deposition of the barrier coating, a layer sensitive to diffusion of alkali metal ions from the glass is applied over the barrier coating. Such a layer may be applied in known manner, e.g. by sputtering, chemical vapour deposition, or spraying of reactants in liquid or solid form onto the coated surface.

The barrier coated glasses are used in accordance with the invention to reduce the diffusion of alkali metal ions from a glass containing alkali metal ions into an overlying layer sensitive to alkali metal ions, which may be directly on the barrier layer or over an intermediate layer. The overlying layer may be a light transmitting electroconductive metal oxide coating. Such coatings, as used commercially, generally have a resistivity of less than 500 ohms per square; some applications require a much lower resistivity e.g. less than 50 ohms per square and employ coatings that have as low a resistivity as possible consistent with satisfactory optical properties. According to EP 0 071 865 A3 referred to above, such coatings are prone to deterioration on diffusion of alkali metal ions from an underlying glass substrate with loss of light transmission and reduction in electroconductivity. Examples of light transmitting electroconductive metal oxides are doped metal oxides and include indium oxide doped with tin, which is usually deposited by sputtering, and doped tin oxides, especially fluorine-doped tin oxide, which may be deposited by sputtering, or by chemical vapour deposition, or by solution or powder spray. The thickness of the electroconductive layer will depend on the conductivity required, but will commonly be in the range 50 nm to 1500 nm.

Transparent electroconductive metal oxides, for example tin doped indium oxide and fluorine doped tin oxide, usually reflect infra red radiation and so are useful as coatings on window glass to reflect heat back into buildings. When used as infra red reflecting layers, such coatings generally have thicknesses in the range 200 nm to 1000 nm.

Thus, according to a further aspect of the invention, there is provided electroconductive flat glass comprising a glass substrate containing alkali metal ions, coated with a transparent barrier layer up to 50 nm thick containing silicon and oxygen by pyrolysis of silane gas on a glass surface above 600° C. in the presence of a gaseous electron donating compound whereby oxygen from the glass is incorporated with silicon to form the transparent barrier coating on the glass surface, and an electroconductive metal oxide layer having a resistivity of less than 500 ohms per square over the barrier layer. The electroconductive metal oxide layer may be a light transmitting layer, and may be of a doped metal oxide.

Similarly, the invention provides infra red reflecting flat glass comprising a glass substrate containing alkali metal ions, coated with a transparent barrier layer up to 50 nm thick containing silicon and oxygen by pyrolysis of a silane gas on a glass surface above 600° C. in the presence of a gaseous electron donating compound whereby oxygen from the glass is incorporated with silicon to form the transparent barrier coating on the glass surface and a light transmitting, infra red reflecting doped metal oxide layer over the barrier layer.

The barrier coated glasses have additional advantages when used in more complex systems, e.g. as substrates for electroconductive metal oxide coatings in liquid crystal display devices. Such devices may comprise two opposed electroconductive layers with a liquid crystal material between the layers, and an alignment layer over each said electroconductive layer; at least one of the electroconductive layers being a light transmitting layer supported on a glass surface with a barrier layer between the electroconductive layer and the glass. In such cases, the barrier layer not only protects the electroconductive metal oxide layer from direct attack by alkali metal ions from the glass, but also prevents undesirable electrochemical reactions resulting from diffusion of alkali metal ions through the electroconductive metal oxide layer into the liquid crystal material.

The thickness of the glass is not critical and will generally depend on the intended use of the glass. Barrier coatings in accordance with the invention may be formed on glass of a wide range of thickness e.g. from 0.1 mm to 12 mm or even thicker.

The glass used in liquid crystal displays is very thin, usually not more than 2 mm thick and preferably less than 1.5 mm thick. Thus the invention further provides, as new products, glass up to 2 mm thick with a transparent barrier coating up to 50 nm thick containing silicon and oxygen deposited by pyrolysis of a silane gas in the presence of a gaseous electron donating compound where by oxygen from the glass is incorporated with silicon to form the transparent barrier coating on the glass surface, and a liquid crystal display device comprising two opposed electroconductive layers, with a liquid crystal material between the layers and an alignment layer over each said electroconductive layer in contact with the liquid crystal material in which at least one of said electroconductive layers is supported on a glass substrate up to 2 mm thick containing alkali metal ions and, between said electroconductive layer and the glass, a transparent barrier layer up to 50 nm thick containing silicon and oxygen deposited on the glass by pyrolysis of silane in the presence of a gaseous electron donating compound whereby oxygen from the glass is incorporated with silicon to form the transparent barrier coating on the glass surface.

A simple liquid crystal display device according to the invention is shown in schematic form in the drawing. Opposed parallel glass sheets 1 and 11 are separated by a peripheral seal 2 and define with the seal a rectangular chamber 3 containing liquid crystal material 4. Each of the sheets 1 and 11 carries a transparent barrier coating 5,15 deposited in accordance with the invention and oriented towards the liquid crystal material 4, an electroconductive coating 6,16 over the transparent barrier coating and an alignment layer 7,17 over the electroconductive layer and in contact with the liquid crystal material 4. The light transmitting properties of the liquid crystal material 4 may be controlled by application of a potential difference between the electroconductive layers 6,16.

The transparent barrier coated glasses are also useful as transparent outer layers in amorphous silicon solar cells, where migration of alkali metal ions out of the glass surface into the amorphous silicon reduces the efficiency of the cell.

The barrier coatings used in the present invention are highly effective in controlling migration of alkali metal ions. Moreover, because they are effective in very thin layers, they may be used to provide barrier coated glass of high visible light transmission. Because the coatings incorporate oxygen from the glass, it is not necessary to use strongly oxidising conditions for their production, and they are suitable for commercial production on-line on a ribbon of float glass as it passes over the float bath.

Transparent barrier coatings as used in the present invention prepared using ethylene were examined by infra-red spectroscopy for the presence of Si-H bonds, but no infra-red absorptions corresponding to Si-H bonds could be detected.

The invention is illustrated but not limited by the following Examples. Unless otherwise stated, gas volumes were measured under ambient conditions i.e. approximately 20° C. and 1 atmosphere pressure.

EXAMPLES 1-4

A ribbon of 6 mm float glass was coated over a 3 metre width with a barrier coating as it advanced over the float bath by passing a mixture of 50 litres/minute of 10% by volume monosilane in 90% by volume nitrogen and 10 litres/minute of ethylene parallel to the glass surface under laminar flow conditions as described in U.K. Patent Specification 1,507,996. The temperature of the glass at the coating station was 625° C. and the lehr speed of the glass ribbon was 370 metres/hour. The flow rate of ethylene was then increased and barrier coatings applied at ethylene flow rates of 20, 30, 40 and 50 litres/minute.

The ethylene:silane ratios used in the coating gases and the results of measurements on the coatings produced are set out in Table 1.

The use of ethylene results in a reduction in light reflection and a rapid increase in light transmission up to an ethylene:silane ratio of about 4:1. Further increase in the ethylene:silane ratio results in a further but slower increase in light transmission of the product.

The effectiveness of the coatings as barriers to the migration of alkali metal ions from the glass surface was determined as described below.

Two samples of the coated glass, each 10 cm square, were cut and clamped together with an

TABLE 1

| Example | Mole ratio ethylene/silane | Coating Thickness (nm) | Light Transmission* % | Light Reflection* % | Alkali metal ion extraction microgram/dm² |
|---|---|---|---|---|---|
| Comparative | 2 | 50 | 67.3 | 24.5 | 9 |
| 1 | 4 | 50 | 81.3 | 12.6 | 18 |
| 2 | 6 | 32 | 82.5 | 11.0 | 22 |
| 3 | 8 | 30 | 83.0 | 9.5 | 26 |
| 4 | 10 | 17 | 84.4 | 8.9 | 26 |

*determined using a C.I.E. Illuminant C source on the side of the glass remote from the coating.

annular silicone rubber ring of internal diameter 8.5 cm between them to form a cylindrical cell with its walls defined by the coated surface of the glass and the inner surface of the silicone rubber ring. The cell was filled with de-ionised water through a hole in the rubber ring, the hole sealed and the sealed cell immersed in a water bath at 96° C. for 48 hours. The solution was removed and analysed for sodium by flame emission spectroscopy. The sodium extract was determined and expressed as micrograms of $Na_2O$ per square decimetre of glass exposed to the water in the cell.

The test was also carried out on a number of commercially available soda lime silica glasses with silica ion-blocking surface layers. The results obtained ranged from 60 microgram $Na_2O/dm^2$ to over 1000 microgram $Na_2O/dm^2$. An uncoated commercially available glass, nominally alkali free, was also tested and a result of 13 microgram $Na_2O/dm^2$ obtained.

It will be seen that the coated glass used in the invention compares favourably with commercially available nominally alkali free glasses and coated glasses which, it is believed, are prepared by off-line methods not readily adaptable for the on-line coating of float glass.

The product of Example 3 was analysed by ESCA (electron spectroscopy for chemical analysis). In this technique, the surface to be analysed is irradiated with X-rays, and the elements present in the surface are characterised and quantified by examining the energy spectrum of the primary electrons emitted from the surface. The surface atomic layers are then removed by argon etching to expose sub-surface atoms which are then characterised and quantified as described above. The etching and analysis steps are repeated to build up a profile of the composition of the surface layers to a depth in excess of the thickness of the coating.

The results obtained for the product of Example 3 are set out below.

| Etch time (seconds) | 0 | 300 | 600 | 900 | 1200 | 1500 |
|---|---|---|---|---|---|---|
| Atomic % silicon | 20 | 35 | 36 | 37 | 37 | 35 |
| Atomic % oxygen | 31 | 45 | 39 | 35.5 | 37 | 43 |
| Atomic % carbon | 45.5 | 17 | 22 | 24 | 20 | 15 |

The coating is found to contain silicon, oxygen and carbon. The ratio of oxygen:silicon at the surface of the coating is approximately 3:2. It falls to about 1:1 after 900 seconds etch and subsequently increases. The concentration of carbon at the surface is 45%, and it varies around 20% through the thickness of the coating.

EXAMPLES 5 and 6

A ribbon of 2 mm float glass was coated with a transparent barrier coating of silicon and oxygen as it advanced over the float bath by passing a mixture of monosilane, nitrogen and ethylene parallel to the glass surface under laminar flow conditions as described in U.K. Patent Specification 1,507,996. The temperature of the glass at the coating station was 660° C. and the lehr speed of the glass ribbon was 1030 metres/hour.

The gas flows and properties of the products obtained are set out in Table 2.

The coatings produced had useful ion blocking properties. The light reflection increased with increasing ethylene:silane ratio giving a light transmission of 84.9% at a ratio of 3.3:1. Calculations indicated that 1 mm glass with a similar coating would have a light transmission of 85.4%, compared with a

TABLE 2

| Example | Conc. of silane in nitrogen (% by volume) | Rate of flow of silane in nitrogen (liter/minute/meter width of glass) | Rate of flow of ethylene (liter/minute/meter width of glass) | Molar ratio ethylene:silane | Light transmission* % | Light Reflection* % | Alkali metal ion+ extraction microgram/dm² |
|---|---|---|---|---|---|---|---|
| 5 | 15 | 30 | 10 | 2.2:1 | 76.5 | 18.5 | 4 |

TABLE 2-continued

| Example | Conc. of silane in nitrogen (% by volume) | Rate of flow of silane in nitrogen (liter/minute/meter width of glass) | Rate of flow of ethylene (liter/minute/meter width of glass) | Molar ratio ethylene:silane | Light transmission* % | Light Reflection* % | Alkali metal ion+ extraction microgram/dm² |
|---|---|---|---|---|---|---|---|
| 6 | 15 | 30 | 15 | 3.3:1 | 84.9 | 12.5 | 18 |

*determined using a C.I.E. Illuminant C source on the side of the glass remote from the coating.
+determined as described with reference to Examples 1 to 4.

transmission of 91.4% for uncoated 1 mm glass.

EXAMPLES 7-9

A ribbon of 1.3 mm float glass was coated with a barrier coating of silicon and oxygen as it advanced over the float bath by passing a mixture of monosilane, nitrogen and ethylene parallel to the glass surface under laminar flow conditions as described in U.K. Patent Specification 1,507,996. The temperature of the glass at the coating station was 640° C. and the lehr speed of the glass ribbon was 1200 metres/hour.

The gas flows and properties of the products obtained are set out in Table 3.

The ion blocking performance (as measured by the alkali metal ion extraction tests), although not equal to the outstanding performance of earlier Examples, was comparable with commercially available glasses and satisfactory for commercially application. The products had a high (about 90%) light transmission.

of ethylene over the heated glass surface at 630° C. for times of from 10 to 40 seconds. The times used and properties of the resulting coatings are shown in Table 5.

TABLE 5

| Example | Coating Time (seconds) | Light Transmission* % | Thickness nm |
|---|---|---|---|
| 14 | 10 | 89.0 | 19 |
| 15 | 20 | 85.2 | 28 |
| 16 | 40 | 79.2 | 39 |
| comparative | 80 | 55.2 | 74 |

*determined using C.I.E. Illuminant C source on the side of the glass remote from the coating.

The observed light reflection of the coated glass increases with coating time, the coating produced after 80 seconds being similar in appearance to reflecting coatings produced using only small proportions of ethylene.

TABLE 3

| Example | Conc. of silane in nitrogen (% by volume) | Rate of flow of silane in nitrogen (liter/minute/meter width of glass) | Rate of flow of ethylene (liter/minute/meter width of glass) | Molar ratio ethylene:silane | Light transmission* % | Light Reflection* % | Alkali metal ion+ extraction microgram/dm² |
|---|---|---|---|---|---|---|---|
| 7 | 15 | 40 | 20 | 3.3:1 | 89.7 | 8.8 | 50 |
| 8 | 15 | 30 | 15 | 3.3:1 | 90.1 | 8.7 | 86 |
| 9 | 15 | 30 | 23 | 5:1 | 90.7 | 8.2 | 400 |

TABLE 4

| Example | EDC | Gas flow rate (liters/minute) N₂ | Gas flow rate (liters/minute) 10% SiH₄/N₂ | Gas flow rate (liters/minute) EDC | EDC silane ratio | Glass surface temperature (°C.) | Deposition time (seconds) | Light transmission* % | Alkali metal ion+ extraction microgram/dm² |
|---|---|---|---|---|---|---|---|---|---|
| 10 | ethylene | 6.5 | 0.11 | 0.11 | 10 | 630 | 60 | 80 | 18 |
| 11 | 1% xylene in nitrogen | 6.5 | 0.11 | 0.001 | 0.1 | 630 | 90 | 78 | 22 |
| 12 | ammonia | 6.5 | 0.11 | 0.06 | 5.5 | 628 | 70 | 86 | 18 |
| 13 | acetylene | 6.5 of 10% H₂ in N₂ | 0.65 | 0.65 | 10 | 625 | 60 | 88 | 31 |

*determined using a C.I.E. Illuminant C source on the side of the glass remote from the coating.
+determined as described with reference to Examples 1 to 4.

EXAMPLES 10-13

Static samples of 4 mm float glass were coated in the laboratory by passing over the heated glass surface a coating gas comprising a mixture of nitrogen, 10% monosilane in nitrogen and a gaseous electron denoting compound (EDC). The composition of coating gases used, glass temperatures and deposition times and properties of the coated glass products are set out in Table 4.

It will seem that the use of other gaseous electron donating compounds in place of ethylene gives transparent coatings with similar ion barrier properties. The coatings are transparent and contain silicon, and oxygen derived from the glass.

EXAMPLES 14 16

Static samples of 4 mm float glass were coated in the laboratory by passing coating gas comprising a mixture of 6.6 litres/minute nitrogen, 0.4 litres/minute of 10% by volume monosilane in nitrogen and 0.4 litres/minute This series of experiments shows that, as the coating time increases, and the coating thickness builds up, the oxygen available from the glass is used up and the coating deposited loses its transparency. This is believed to be due to deposition of unoxidised silicon on top on the initial transparent coating containing silicon and oxygen derived from the glass. The coatings were all tested for durability against external alkali attack by immersion in 1N NaOH at 80° C. In each case, there was no visible sign of attack after 50 minutes.

EXAMPLES 17-33

Static samples of 4 mm float glass were coated in the laboratory by passing a coating gas over the hot glass surface at 630° C. The composition of coating gas used, coating time and properties of the coated products are shown in Table 6. In each case, the ratio of gaseous electron donating compound:silane was adjusted to produce a transparent coating.

TABLE 6

| Example | EDC | Gas Flows (liters/minute) 10% $SiH_4$ in $N_2$ | EDC | $N_2$ | Molar ratio EDC:silane | Coating time (seconds) | Light Transmission* % | Thickness (nm) | Alkali metal ion+ Extraction microgram/dm² | Alkali durability |
|---|---|---|---|---|---|---|---|---|---|---|
| 17 | carbon dioxide | 0.40 | 0.40 | 6.6 | 10 | 10 | 88.4 | — | — | poor |
| 18 | carbon dioxide | 0.40 | 0.12 | 6.8 | 3 | 13 | 85.0 | 35 | 40 | poor |
| 19 | dimethyl ether | 0.35 | 0.56 | 6.5 | 16 | 11 | 88.9 | 39 | 26 | good |
| 20 | but-i-ene | 0.36 | 0.24 | 6.8 | 6.7 | 11 | 89.4 | 19 | 18 | — |
| 21 | carbon monoxide | 0.34 | 0.50 | 6.6 | 14.7 | 12 | 87.0 | 25 | 36 | poor |
| 22 | dimethylamine | 0.40 | 0.30 | 6.7 | 7.5 | 12 | 89.4 | 25 | 84 | — |
| 23 | acetone | 0.38 | 0.06 | 6.8 | 1.6 | 12 | 89.6 | 14 | — | — |
| 24 | acetone | 0.11 | 0.022 | 7.0 | 2 | 90 | 90.5 | 20 | 35 | — |
| 25 | ammonia | 0.35 | 0.35 | 6.7 | 10 | 12 | 89.0 | 22 | — | good |
| 26 | ammonia | 0.11 | 0.06 | 6.5 | 5.5 | 70 | 86.0 | — | 18 | good |
| 27 | isopropanol | 0.38 | 0.013 | 6.8 | 0.3 | 12 | 79.5 | 28 | 40 | good |
| 28 | acetaldehyde | 0.38 | 0.025 | 6.9 | 0.7 | 12 | 88.6 | 21 | 36 | good |
| 29 | water | 0.11 | 0.004 | 6.6 | 0.4 | 60 | 86.0 | 30 | 181 | poor |
| 30 | nitric oxide | 0.40 | 0.10 | 6.9 | 2.5 | 11 | 90.5 | 40 | 40 | good |
| 31 | nitrous oxide | 0.75 | 0.15 | 6.5 | 2.0 | 7 | 89.0 | 30 | 13 | poor |
| 32 | ethylene oxide | 0.20 | 0.08 | 6.5 | 4.0 | 40 | 91.0 | 45 | 13 | — |
| 33 | nitrogen dioxide | 0.40 | 0.11 | 6.9 | 2.7 | 12 | 88.5 | 40 | 40 | poor |

*determined using C.I.E. Illuminant C source on the side of the glass remote from the coating.
+determined as described with reference to Examples 1 to 4.

EXAMPLE 34

A sample prepared by a technique similar to that described in Example 1 to 4 at an ethylene to silane ratio of 5:1, and a sample of uncoated clear 6 mm float glass were coated with fluorine doped tin oxide. Ammonium difluoro tetrachlorostannate, $(NH_4)_2SnCl_4F_2$, was pin milled to a particle size not exceeding 50 microns, dispersed in a stream of air, and the air stream containing the dispersed powder directed onto the heated glass samples at about 580° C. at a rate of 80 grams per square metre of glass. The thickness of the resulting fluorine doped tin oxide coatings and their electrical resistivities were measured. The results obtained are set out below:

| | Tin oxide thickness (nm) | Specific Resistivity (ohm cm) |
|---|---|---|
| Barrier coated substrate | 58 | $1.7 \times 10^{-3}$ |
| Uncoated substrate | 56 | $3 \times 10^{-3}$ |

The significantly lower resistivity of the coating on the barrier coated substrate illustrates the value of the barrier coating in inhibiting migration from the glass of alkali metal ions, with their deleterious effect on the resistivity of the doped tin oxide layer.

EXAMPLE 35

Liquid crystal display devices as described herein were made up using glass carrying a transparent barrier coating produced substantially as described in Example 8 as a substrate, and subjected to durability testing. They were found to have lifetimes in excess of 1000 hours at 60° C. and a relative humidity of 95%.

All the electron denoting compounds used in the Examples were compounds having a vapour pressure above 760 mm at 60° C., except the following whose vapour pressure at 60° C. is as stated below:

| Isopropanol | 40 kPa |
| Xylene | 8 kPa |
| Water | 20 kPa |

I claim:

1. A method of making coated flat glass up to 6 mm thick with reduced diffusion of alkali metal ions from the glass into an overlying layer sensitive to the diffusion of alkali metal ions that the glass contains, which method comprises providing between the glass and said overlying layer a transparent barrier coating up to 50 nm thick containing silicon and oxygen applied by pyrolysis of a silane gas on a glass surface above 600° C. in the presence of a gaseous electron donating compound, whereby oxygen from the glass is incorporated with silicon to form a transparent barrier coating on the glass surface, the electron-donating compound being used in a proportion to silane to produce a transparent coating such that when the coating is present on the clear flat glass which has a thickness of up to 6 mm, the coated glass has a light transmission of at least 80%.

2. A method according to claim 1 wherein the silane gas is monosilane ($SiH_4$).

3. A method according to claim 1 wherein the silane is diluted with an inert gas.

4. A method according to claim 1 wherein the electron donating compound is oxygen free.

5. A method according to claim 1 wherein the gaseous electron donating compound is an olefin containing 2 to 4 carbon atoms.

6. A method according to claim 5 wherein the gaseous electron donating compound is ethylene.

7. A method according to claim 1 wherein the ratio of the gaseous electron donating compound to silane is from 0.5:1 to 15:1 by volume.

8. A method according to claim 1 wherein the glass is up to 2 mm thick.

9. A method according to claim 1, wherein the barrier coating is applied to a ribbon of float glass as it is advanced over the molten metal bath on which it is formed.

10. A method according to claim 1, wherein the ratio of the gaseous electron donating compound to silane is from 0.5:1 to 15:1 by volume, and the transparent barrier coating is applied to a ribbon of float glass up to 2 mm thick as it is advanced over the molten metal bath on which it is formed.

11. A method of making coated flat glass, up to 6 mm thick, that contains alkali metal ions, which method comprises pyrolysing a silane gas of the glass surface above 60° C. in the presence of a gas electron donating compound, whereby oxygen from the glass is incorporated with silicon to form on the glass surface a transparent barrier coating up to 50 nm thick containing silicon and oxygen, and applying a layer sensitive to the diffusion of alkali metal ions from the glass over the coated glass surface, the electron-donating compound being used in a proportion to silane to produce a transparent coating such that when the coating is present on the clear flat glass which has a thickness of up to 6 mm, the coated glass has a light transmission of at least 80%.

12. A method according to claim 11 wherein the silane gas is monosilane ($SiH_4$).

13. A method according to claim 11 wherein the silane is diluted with an inert gas.

14. A method according to claim 11 wherein the electron donating compound is oxygen free.

15. A method according to claim 11 wherein the gaseous electron donating compound is an olefin containing 2 to 4 carbon atoms.

16. A method according to claim 15 wherein the gaseous electron donating compound is ethylene.

17. A method according to claim 11 wherein the ratio of the gaseous electron donating compound to silane is from 0.5:1 to 15:1 by volume.

18. A method according to claim 11 wherein the glass is up to 2 mm thick.

19. A method according to claim 11 wherein the barrier coating is applied to a ribbon of float glass as it is advanced over the molten metal bath on which it is formed.

20. A method according to claim 11 wherein the ratio of the gaseous electron donating compound to silane is from 0.5:1 to 15:1 by volume, and the transparent barrier coating is applied to a ribbon of float glass up to 2 mm thick as it is advanced over the molten metal bath on which it is formed.

21. A method according to claim 11 which comprises applying a light transmitting layer of a doped metal oxide over the barrier coating.

22. A liquid crystal display device comprising two opposed electroconductive layers with a liquid crystal material between the layers and an alignment layer over each said electroconductive layer in contact with the liquid crystal material, in which at least one of said electroconductive layers is supported on a glass substrate up to 2 mm thick containing alkali metal ions, and, between said electroconductive layer and the glass, there is provided a transparent barrier coating up to 50 nm thick containing silicon and oxygen deposited on the glass surface above 600° C. by pyrolysis of silane in the presence of a gaseous electron donating compound whereby oxygen from the glass is incorporated with silicon to form the transparent barrier coating on the glass surface, the electron-donating compound being used in a proportion to silane to produce a transparent coating such that the coated glass has a light transmission of at least 80%.

23. Electroconductive flat glass comprising a glass substrate containing alkali metal ions, coated with a transparent barrier coating up to 50 nm thick containing silicon and oxygen by pyrolysis of a silane gas on a glass surface above 600° C. in the presence of a gaseous electron donating compound whereby oxygen from the glass is incorporated with silicon to form the transparent barrier coating on the glass surface, and an electroconductive metal oxide layer having a resistivity of less than 500 ohms per square over the barrier layer, the electron-donating compound being used in a proportion to silane to produce a transparent coating such that the coated glass has a light transmission of at least 80%.

24. Infra red reflecting flat glass comprising a glass substrate containing alkali metal ions, coated with a transparent barrier layer up to 50 nm thick containing silicon and oxygen by pyrolysis of a silane gas on a glass surface above 600° C. in the presence of a gaseous electron donating compound whereby oxygen from the glass is incorporated with silicon to form the transparent barrier coating on the glass surface, and a light transmitting infra red reflecting doped metal oxide layer over the barrier coating, the electron-donating compound being used in a proportion to silane to produce a transparent coating such that the coated glass has a light transmission of at least 80%.

* * * * *